United States Patent
Harris

(10) Patent No.: US 9,119,384 B2
(45) Date of Patent: Sep. 1, 2015

(54) FISHING REEL

(71) Applicant: Vaughn Harris, West Jordan, UT (US)

(72) Inventor: Vaughn Harris, West Jordan, UT (US)

(73) Assignee: Vaughn Harris, West Jordan, UT (US)

( * ) Notice: Subject to any disclaimer, the term of this patent is extended or adjusted under 35 U.S.C. 154(b) by 0 days.

(21) Appl. No.: 13/928,438

(22) Filed: Jun. 27, 2013

(65) Prior Publication Data

US 2013/0292503 A1   Nov. 7, 2013

Related U.S. Application Data

(63) Continuation of application No. 13/315,100, filed on Dec. 8, 2011, now Pat. No. 8,490,907.

(60) Provisional application No. 61/421,004, filed on Dec. 8, 2010.

(51) Int. Cl.
    *A01K 89/01* (2006.01)
    *A01K 89/015* (2006.01)

(52) U.S. Cl.
    CPC ........... *A01K 89/0108* (2013.01); *A01K 89/015* (2013.01); *Y10T 29/49826* (2015.01)

(58) Field of Classification Search
    USPC .................. 242/228, 229, 231, 233, 234, 235
    See application file for complete search history.

(56) References Cited

U.S. PATENT DOCUMENTS

| | | | |
|---|---|---|---|
| 2,602,602 A | 7/1952 | Vijande |
| 2,633,307 A | 3/1953 | Morgan et al. |
| 2,708,077 A | 5/1955 | Dalzell et al. |
| 2,746,694 A | 5/1956 | Kauppi |
| 3,004,731 A | 10/1961 | Mauborgne |
| 3,425,643 A | 2/1969 | Lemon |
| 3,727,857 A | 4/1973 | Chann |
| 3,903,635 A | 9/1975 | Boese |
| 3,944,159 A | 3/1976 | Dobbs |
| 4,184,651 A | 1/1980 | McConachy |
| 4,213,579 A | 7/1980 | Fox |
| 4,522,354 A | 6/1985 | Sato et al. |
| 4,750,687 A | 6/1988 | Sievert et al. |
| 4,892,267 A | 1/1990 | Webb |
| 4,966,336 A | 10/1990 | Humble et al. |
| 5,505,396 A | 4/1996 | Chesterfield et al. |
| 5,947,398 A | 9/1999 | Yeh |
| 5,947,399 A | 9/1999 | Oh |
| 6,021,970 A | 2/2000 | Fritts |
| 6,561,448 B2 | 5/2003 | Barker |
| 7,178,751 B1 | 2/2007 | Isaacs |
| 7,478,774 B2 | 1/2009 | Chang |
| 7,896,277 B2 | 3/2011 | Lombardo et al. |
| 2009/0166460 A1 | 7/2009 | Kitajima |

OTHER PUBLICATIONS

Daiwa® Emblem-Z2500i Spinning Reel; 1 page; Date unknown, client believes that this product was available to the public sufficiently earlier than the effective filing of this patent application.

*Primary Examiner* — Emmanuel M Marcelo

(57) ABSTRACT

A fishing reel can include a reel frame and a spool shaft extending through the reel frame and rotatably supported about the reel frame. A crankable handle can be mechanically coupled to the spool shaft such that a rotation of the handle causes a rotation of the spool shaft. A non-rotating pivotable bail can be coupled to the reel frame. A spool can be mechanically coupled to the spool shaft and configured to rotate with the rotation of the spool shaft relative to the bail.

15 Claims, 8 Drawing Sheets

// FISHING REEL

CROSS REFERENCE TO RELATED APPLICATIONS

This application is a continuation application of U.S. patent application Ser. No. 13/315,100, filed Dec. 8, 2011, which claims the benefit of U.S. Provisional Patent Application Ser. No. 61/421,004, filed Dec. 8, 2010, which are both incorporated by reference herein in their entireties.

BACKGROUND

In modern times, various advanced devices have been developed for catching fish. One such device is a spinning reel. A spinning reel includes a fixed spool with a mechanical line pickup to retrieve the cast line. An anti-reverse lever prevents the crank handle from rotating while a fish is pulling fishing line extending from the spool. Because the line does not pull against a rotating spool, lighter lures can be cast as compared with a bait casting reel.

When retrieving fishing line with a spinning reel, the bail housing, bail, and line guide of the bail (bail assembly) are driven to rotate about the rotationally fixed spool and serve to wind the line onto the spool. The rotationally fixed spool generally oscillates up and down to lay the fishing line down evenly on the spool during line takeup.

Bait casting reels are another type of fishing reel. In some aspects, the spinning reel is considered to have some advantages over bait casting reels. For example, the fishing line comes off of the spool more easily with a spinning reel as compared with a bait casting reel because the spool does not spin when casting. As a result a lure can often be cast farther. Also, bait casting reels often experience a casting backlash because of an over-unwinding of the line due to the configuration of the fixed spool.

While spinning reels may present some advantages over other types of reels, there are disadvantages to the use of spinning reels as well. For example, with spinning reels the line can be trapped underneath itself on the spool or may detach from the reel in loose loops of line. Various oscillating spool mechanisms have been introduced, as described above, which can minimize such problems. Another common issue with spinning reels is line twisting. Line twist in spinning reels can result from a number of causes, such as spin of a lure on the fishing line, the movement of the rotating wire bail against the line when turned by the crank handle, or retrieval of fishing line that is under a load, such as when the hook catches on a fish or some other underwater object.

SUMMARY OF EXEMPLARY EMBODIMENTS

A fishing reel can include, in some exemplary embodiments, a reel frame and a spool shaft extending through the reel frame and rotatably supported about the reel frame. A crankable handle can be mechanically coupled to the spool shaft such that a rotation of the handle causes a rotation of the spool shaft. A non-rotating, but pivotable bail can be coupled to the reel frame. A spool can be mechanically coupled to the spool shaft and configured to rotate with the rotation of the spool shaft relative to the non-rotating bail.

A method for forming or configuring a fishing reel can include, in some exemplary embodiments, providing a reel frame and configuring a spool shaft to extend through the reel frame. The spool shaft can be rotatably supported about the reel frame. A crankable handle can be coupled to the spool shaft such that a rotation of the handle causes a rotation of the spool shaft. The method can further include supporting a spool about the spool shaft such that the spool rotates with the rotation of the spool shaft, and pivotally coupling a non-rotating bail to the reel frame.

A fishing reel can include, in some exemplary embodiments, a reel frame and a hollow spool shaft extending through the reel frame, the spool shaft being rotatably supported about the reel frame. A rotor drive wheel can be mechanically coupled to the spool shaft such that a rotation of the rotor drive wheel causes a rotation of the spool shaft. A spool oscillation gear can be rotatably secured to the reel frame and rotatable with rotation of the rotor drive wheel. An oscillation shaft within the hollow spool shaft can be mechanically coupled to the spool oscillation gear to oscillate the oscillation shaft back and forth within the spool shaft along a rotation axis of the spool shaft. A non-rotating pivotable bail can be coupled to the reel frame. A spool can be attached to the oscillation shaft and is configured to rotate and oscillate relative to the bail with the rotation of the oscillation shaft via the rotor drive wheel.

DETAILED DESCRIPTION

Figure 1:
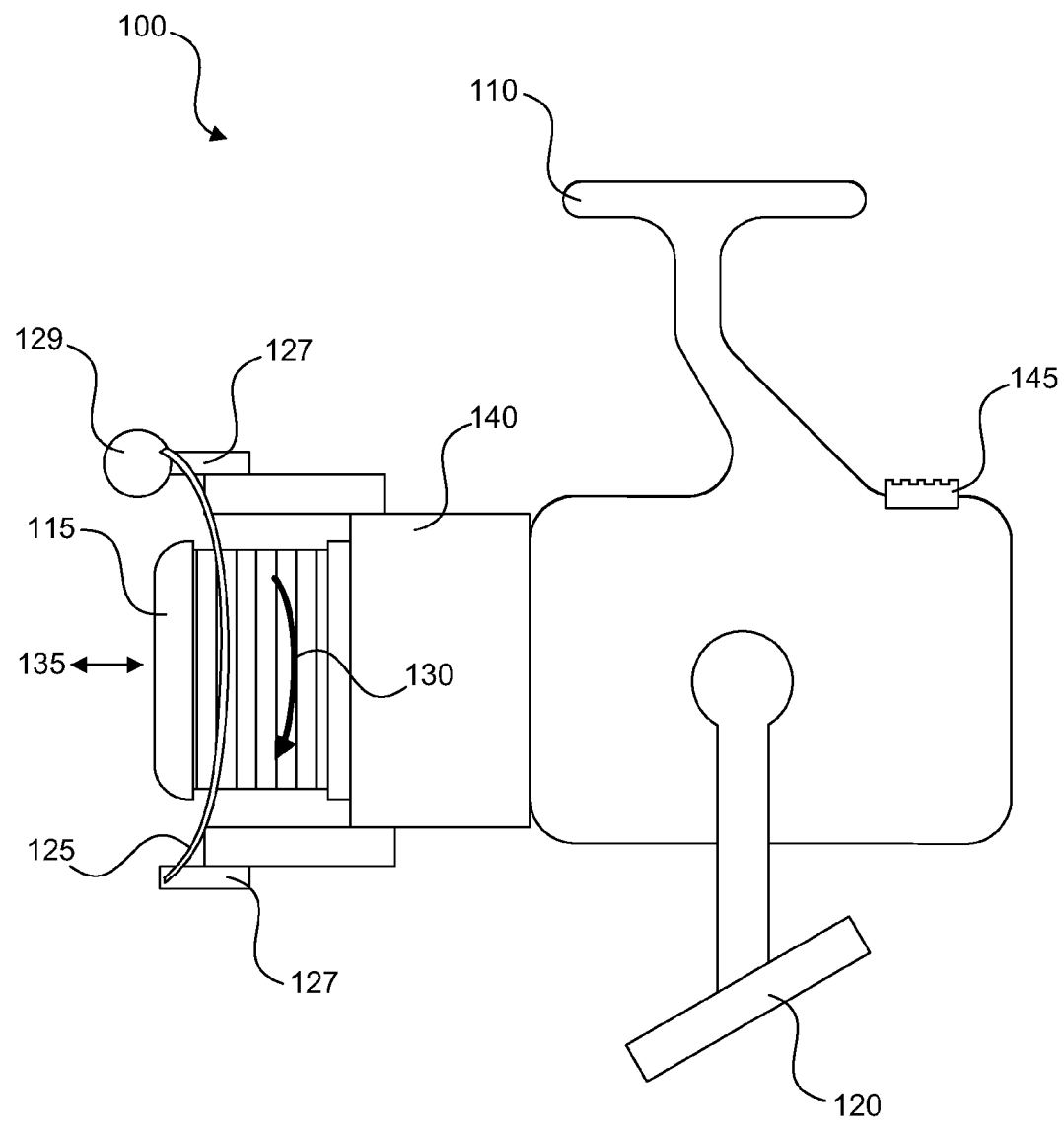
FIG. 1 illustrates a side view of a fishing reel in accordance with an embodiment of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

The following terminology will be used in accordance with the definitions set forth below.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Example Embodiments

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth herein, it is noted in the present disclosure that when describing the system, or the related devices or methods, individual or separate descriptions are considered applicable to one another, at least in part, whether or not explicitly discussed in the context of a particular example or embodiment. For example, in discussing an energy harvester configuration per se, the device, system, and/or method embodiments are also included and may find support in such discussions, and vice versa.

Furthermore, various modifications and combinations can be derived from the present disclosure and illustrations, and as such, the following figures should not be considered limiting.

A fishing reel is described herein which includes a pivoting bail, and thus provides advantages over typical bait casting reels by enabling the fishing line to come off of the spool easily, enabling a lure to be cast farther, and eliminating backlash. The fishing reel further includes an oscillating spool or bail in some examples which addresses issues of fishing line getting trapped or detaching in loops, as is sometimes problematic with spinning reels. Additionally, the bail of the fishing reel is fixed in position and avoids problems of line twist that occur due to the movement of the rotating wire bail against the line when turned by the crank handle with spinning reels.

Referring to FIG. 1, the fishing reel 100 can include a reel frame 110 and a spool shaft (not shown) extending through the reel frame. The spool shaft can be rotatably supported about the reel frame and can be mechanically coupled between the reel frame and a spool 115. A crankable handle 120 is mechanically coupled to the spool shaft such that a rotation of the handle causes a rotation of the spool shaft. The spool is mechanically coupled to the spool shaft and rotates with the rotation of the spool shaft. A non-rotating pivotable bail 125 is coupled to the reel frame. The spool rotates relative to the bail, which is fixed in position relative to the reel frame such that the bail is non-rotating or non-rotatable. As the spool rotates 130, the spool can oscillate 135 up and down (or back and forth) relative to the bail to evenly distribute fishing line around the bail as the fishing line is being wound. The rotational axis of the spool can be substantially parallel to a rotational axis of the spool shaft and an axis along a length of a fishing rod to which the reel frame attaches. In some embodiments, the rotational axis of the spool can be coaxial with the rotational axis of the spool shaft.

The bail 125 can be directly attached to the reel frame or may be attached to a bail support 140 or housing. In the example shown, the spool 115 oscillates up and down as it rotates and may oscillate at least partially within the housing supporting the bail. In another example, the spool can include a collar which extends over the support, as with the Daiwa® Emblem-Z2500i spinning reel, for example. The bail support can be integrally formed with the reel frame or may be coupled thereto, such as by weld, glue, screw, snap-on, friction fit, or any other suitable fastening technology. The bail support can be permanently and non-removably attached to the reel frame in some examples since the bail does not rotate.

The bail 125 can be further supported by one or more bail brackets 127 which can pivot on the bail support 140.

The fishing reel 100 can include various other features found in conventional spinning reels. For example, the fishing reel can include an anti-reverse switch 145. The spool can include the collar which extends over a portion of the reel frame to minimize intrusion of dirt or other particles into inner gearing of the fishing reel (not shown in the figure). Generally, many of the features found in conventional spinning reels can easily be implemented with one or more of the exemplary fishing reels discussed herein with or without further adaptation.

Figure 2:
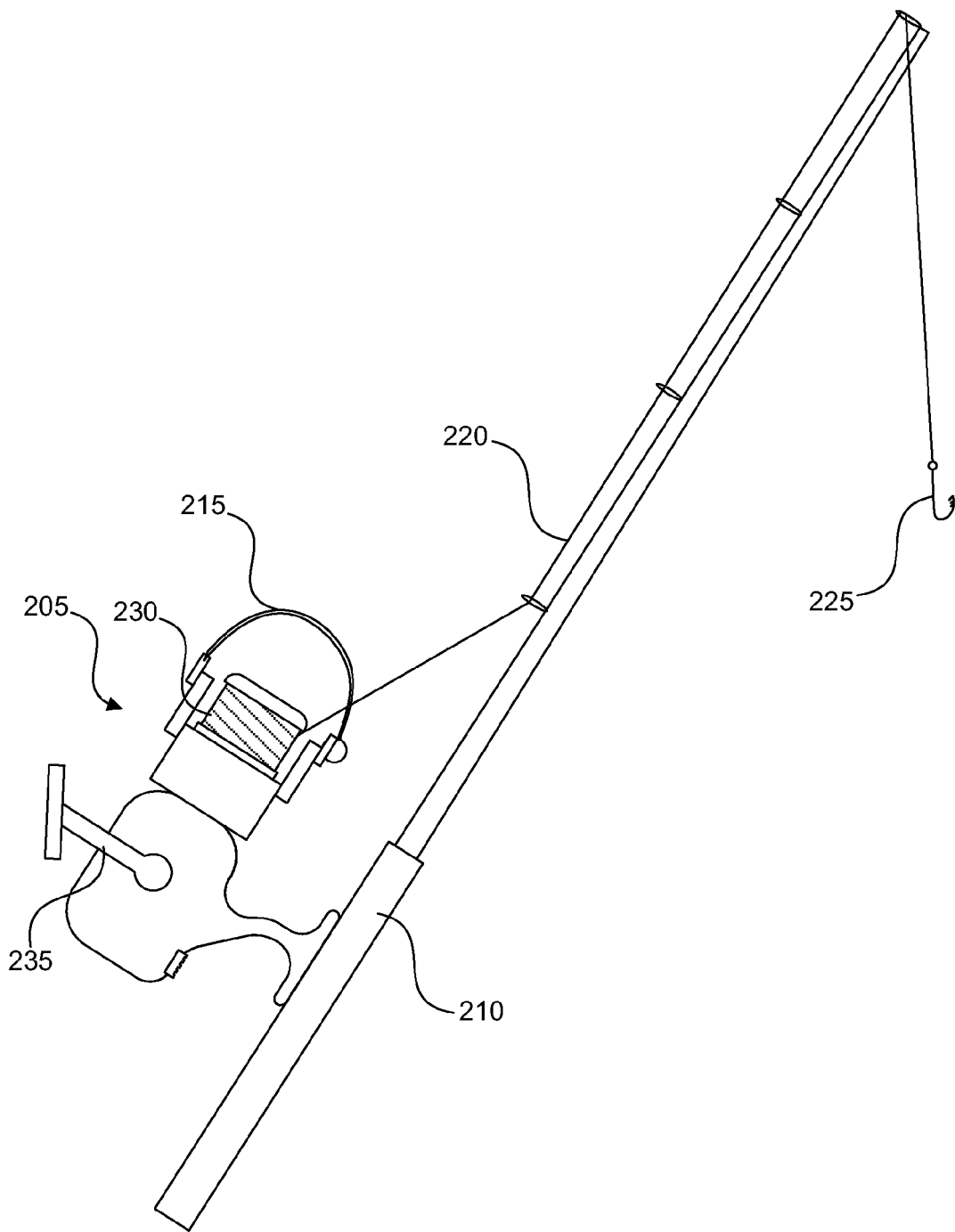
FIG. 2 illustrates a side view of a fishing reel attached to a fishing rod and having a bail thereof in an open position in accordance with an embodiment of the present technology.

Referring to FIG. 2, a side view of an exemplary fishing reel 205 attached to a fishing rod 210 is shown where the bail 215 is in an open, casting position (i.e., a fishing line release position). In this position, as with conventional spinning reels, the fishing line 220 can easily feed off the top of the spool without mechanical rotation of any parts of the reel. With the right-handed fishing reel shown, a user will hold the fishing rod with the right hand, using the index finger of the right hand to hold the fishing line against the rod. The left hand is used to pivot the bail into the open position. The user can swing the fishing rod and release the index finger on the fishing line to enable the fishing line to feed off of the spool as a lure 225 is cast.

Figure 3:
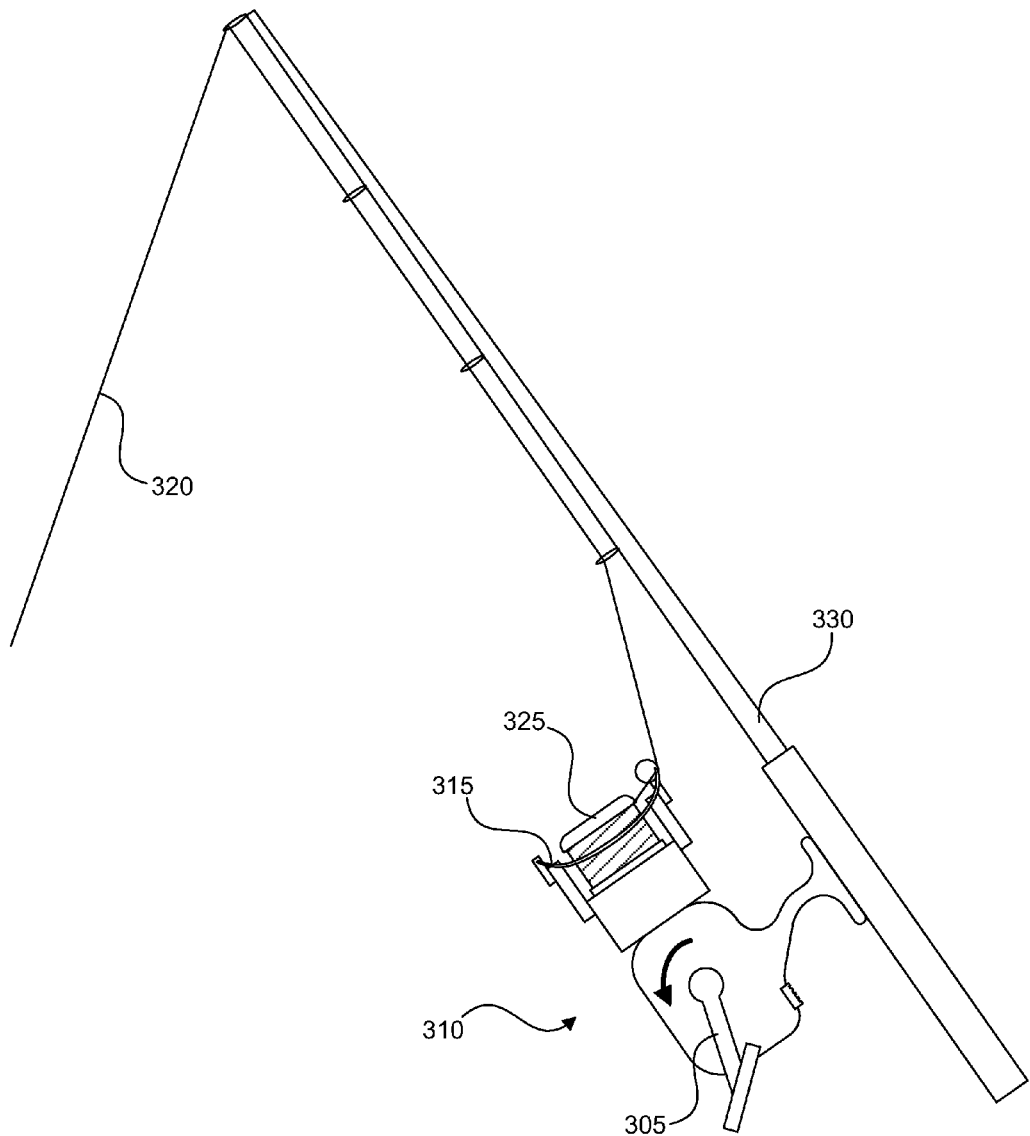
FIG. 3 illustrates a side view of a fishing reel attached to a fishing rod and having a bail thereof in a closed position in accordance with an embodiment of the present technology

Referring to FIG. 3, after the lure is cast the user will typically rotate the handle 305 on the fishing reel 310, which moves a trigger causing the bail 315 to flip into a closed, holding or reeling position (i.e., a fishing line holding position). The closed bail holds the fishing line 320 in place such that the fishing line no longer freely feeds off of the spool. The bail remains in the closed position and is stationary with respect to the reel frame when the handle is further rotated to reel the fishing line in. As the handle is caused to rotate, the spool rotates relative to the bail and operates to pull the fishing line in without causing twisting of the line that can be typical with spinning reels having a fixed spool and rotating bail.

While the spool 230, 325 and crank handle 235, 305 of FIGS. 2-3 may rotate, the bail does not rotate. As a result, when the bail is in the closed position, an orientation of the fishing line 220, 320 is held in a constant position relative to the fishing rod 210, 330. When preparing for casting with a conventional spin casting reel, the user often rotates the crank handle to move the rotating bail to a proper orientation with respect to the rod before grasping the line with the forefinger and pivoting the bail, or else the line and/or bail may be in a position that makes grasping the line or pivoting the bail difficult or uncomfortable. However, with the exemplary reels discussed herein having a non-rotating bail, some of the complexity of conventional spinning reels is removed because the user need not be concerned with alignment of the bail—the bail is always in the proper alignment and ready for the user to grasp the line regardless of a rotation of the spool. The fixed bail thus maintains a consistent orientation of the fishing line on the spool relative to the reel frame. Indeed, the fixed bail may be strategically located or positioned about the reel frame to achieve the most optimal position that will accommodate its users.

Figure 4:
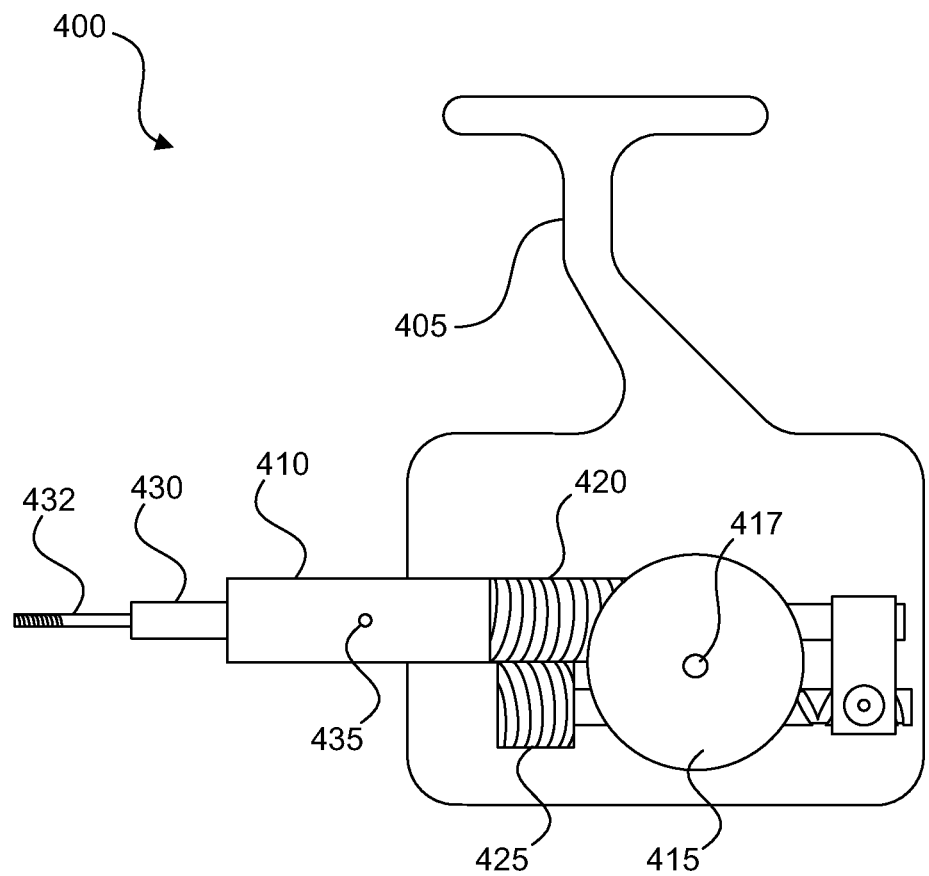
FIG. 4 illustrates a cross-sectional side view of a fishing reel in accordance with an embodiment of the present technology.

Referring to FIG. 4, a cross-sectional side view of a fishing reel 400 is shown in accordance with an exemplary embodiment of the present technology. In this view, one side of the reel frame 405 has been hidden to reveal and facilitate viewing of an inside of the fishing reel. The spool, bail, bail support, and crank handle have also been hidden. FIG. 4, as well as other of the drawings depicted and described, is simplified in some regards to better illustrate operation of the present technology. One of skill in the art will recognize that additional structure and components, such as washers, gears, nuts, bearings, clips, gaskets, shields, covers, planets, retainers, fasteners, screws, and a wide variety of other parts are typically included in a fishing reel to facilitate smooth and functional operation of the reel. For example, the Daiwa® Emblem-Z2500i spinning reel parts list includes many such example parts and illustrates how such parts may be usable and included in the exemplary fishing reels discussed herein. The Daiwa® Emblem-Z2500i spinning reel and its parts list is thus incorporated by reference for exemplary purposes. However, application of the present technology is not limited to any specific make or model of fishing reel and the exemplary reference to a specific make and model reel is intended to be non-limiting.

The exemplary fishing reel 400 of FIG. 4 includes a hollow spool shaft 410 extending through or into the reel frame and which is rotatably supported about the reel frame. A rotor drive wheel 415 is mechanically coupled to the spool shaft such that a rotation of the rotor drive wheel causes a rotation of the spool shaft. The rotor drive wheel can include teeth thereon to interface with a threaded gear portion 420 of the spool shaft to cause the spool shaft to rotate with rotation of the rotor drive wheel. The threaded gear portion of the spool shaft can be integral with the spool shaft. The spool shaft can be supported by the reel frame such that the spool shaft is rotatable within the reel frame while otherwise maintaining a fixed position relative to other components of the fishing reel. As can be appreciated from the figures, the rotation of the rotor drive wheel can be along an axis substantially perpendicular or orthogonal to a rotation axis of the spool shaft. The rotor drive wheel can include an orifice 417 for coupling the crank handle to the rotor drive wheel and to the reel frame.

A threaded spool oscillation gear 425 is rotatably secured to the reel frame 405 and is rotatable with rotation of the rotor drive wheel. The rotor drive wheel rotates the spool shaft 410 at the gear portion 420, which interfaces or meshes with the spool oscillation gear to rotate the spool oscillation gear along an axis substantially parallel to the rotation axis of the spool shaft.

The fishing reel 400 includes an oscillation shaft 430 within the hollow spool shaft 410 and mechanically coupled to the spool oscillation gear 425 to oscillate the oscillation shaft back and forth within the spool shaft along or substantially parallel to the rotation axis of the spool shaft. The oscillation shaft further includes a slot (not shown). A pin 435 extends through the spool shaft and through the slot in the oscillation shaft. The pin forces the oscillation shaft to rotate with the rotation of the spool shaft and the slot is sized and positioned to allow the oscillation shaft to oscillate to a full extent in either direction without obstruction from the pin passing therethrough.

The oscillation shaft can include an attachment portion 432 for receiving the spool and attaching the spool thereto. The oscillation shaft, and the spool attached thereto, can rotate with the rotation of the oscillation shaft via the rotation of the rotor drive wheel.

Figure 5A:
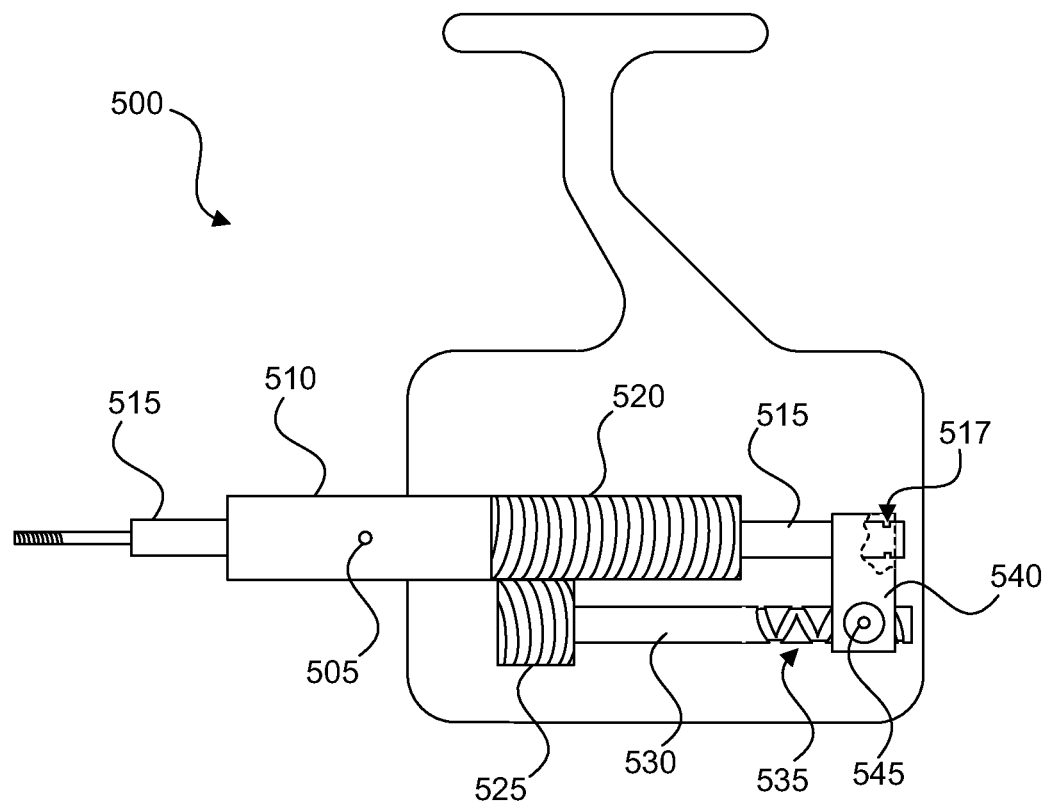
FIG. 5A illustrates the fishing reel of FIG. 4 with a rotor drive while removed in accordance with an embodiment of the present technology.

Referring to FIG. 5A, a fishing reel 500 is shown in which the rotor drive wheel shown in FIG. 4 has been hidden. As has been described, a pin 505 extends through the hollow spool shaft 510 and through a slot in the oscillation shaft 515. Rotation of the spool shaft causes rotation of the oscillation shaft due to the pin extending through the slot. The slot allows the oscillation shaft to oscillate forwards and backwards while simultaneously rotating with the spool shaft.

The rotor drive wheel (not shown) is rotated by the handle (not shown) which turns the gear portion 520 of the spool shaft 510. The oscillation gear interfaces with the gear portion of the spool shaft and is coupled to a worm drive shaft, on which is a worm gear 535. The worm gear is configured with a continuous and crossed pattern. When the worm gear is rotated, a pinion collar 540 with a pawl 545 or follower is moved backwards and forwards along the worm gear with rotation of the worm gear in a single direction. Reversal of the direction of rotation of the worm gear similarly can cause the back and forth movement of the pinion collar and pawl along the worm drive shaft. Thus, regardless of the direction of movement, the oscillation can be caused by movement in a single direction.

FIG. 5A illustrates a partial cut-away of the pinion collar 540 to illustrate an end of the oscillation shaft 515. The oscillation shaft can include a groove 517 which circumscribes the oscillation shaft around the rotation axis. A retainer (not shown) can be used to couple the oscillation shaft to the pinion collar 540 at the groove and hold the oscillation shaft in position relative to the pinion collar while still allowing the oscillation shaft to rotate. Thus, the oscillation shaft 515 and pinion collar 540 with pawl 545 can oscillate while the oscillation shaft rotates within the pinion collar with the rotation of the spool shaft, which turns the worm gear 535, causing the pawl to move along the worm gear path, causing the oscillation of the pinion collar.

Figure 5B:
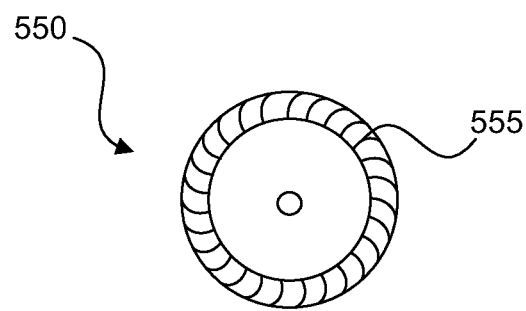
FIG. 5B illustrates a plan view of the rotor drive wheel removed from the fishing reel of FIG. 5A.

FIG. 5B is a plan view of the rotor drive wheel 550 hidden from the fishing reel of FIG. 5A, illustrating the teeth 555 for interfacing with the gear portion 520 of the spool shaft 510, which were hidden in FIG. 4.

Figure 6A:
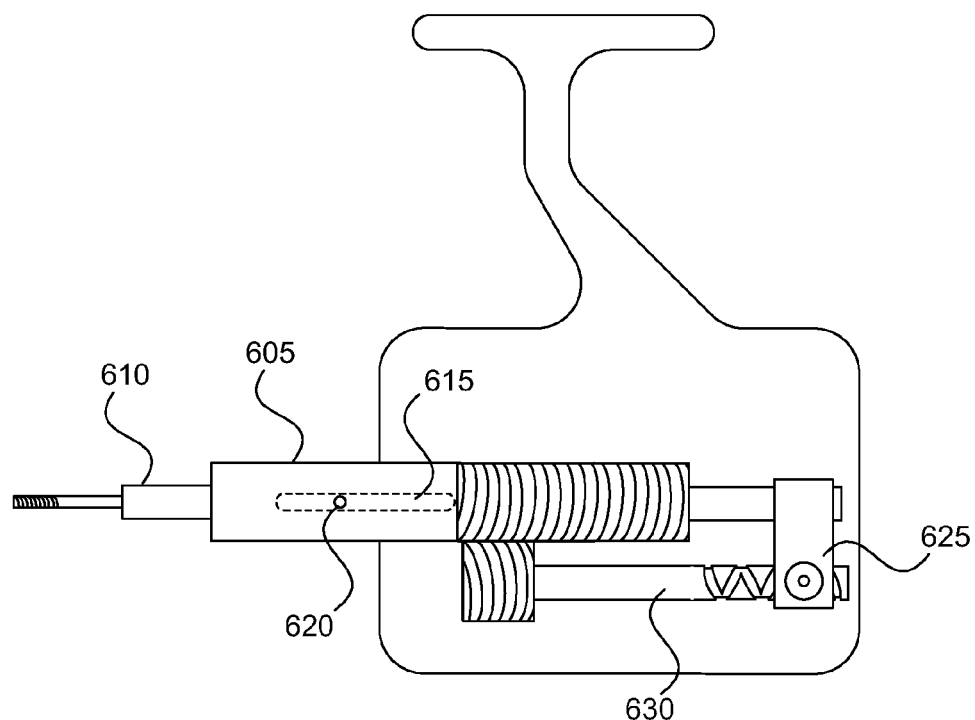
FIGS. 6A-6B illustrate cross-sectional side views of fishing reels with rotating, oscillating oscillation shafts in accordance with an embodiment of the present technology.
Figure 6B:
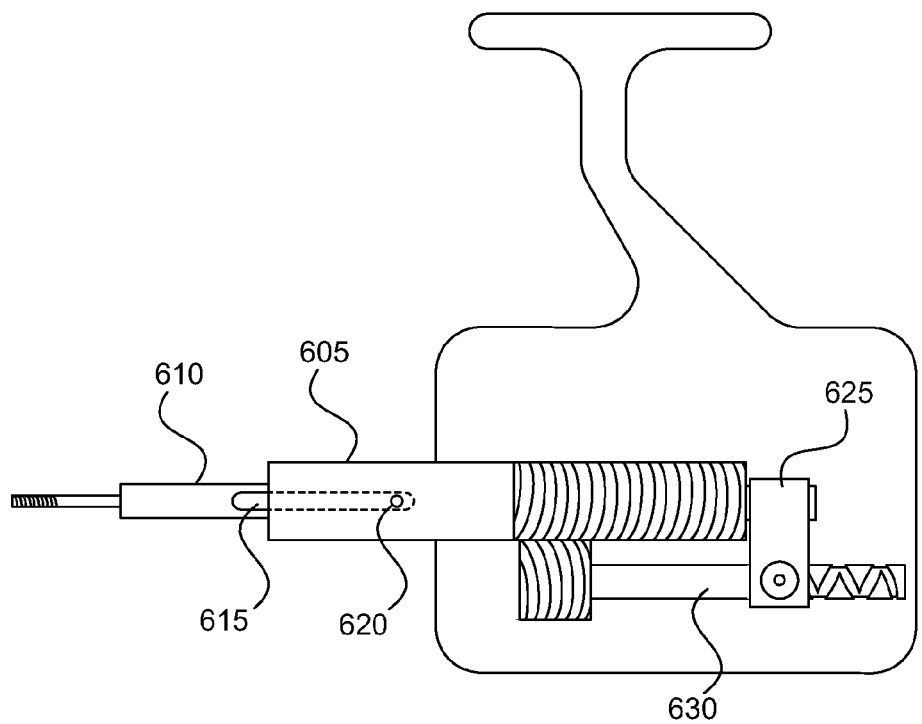

FIGS. 6A-6B illustrate the oscillation of the oscillation shaft 610 within the spool shaft 605, and further illustrate the slot 615 in the oscillation shaft. A pin 620 extends through a hole in the spool shaft and the slot in the oscillation shaft. As illustrated in the figures, the slot in the oscillation shaft is oscillated relative to the pin as the rotation of the gears causes the pinion collar to move along the worm drive shaft and the oscillation shaft to move within the hollow spool shaft.

Where at least part of the construction of a conventional spinning reel is used as a basis for forming the fishing reel of the current technology, additional consideration may be given to the direction of rotation of the spool relative to the bail. For example, in a conventional spinning reel, which based on outward appearances may appear similar to the reel of FIG. 1, and which may include a rotor drive wheel and gearing similar to those illustrated in FIG. 4, rotation of the crank handle would cause the spool to spin in the wrong direction relative to the bail, when turning the crank handle in the conventional direction (counter-clockwise in FIG. 1 for reeling in a fishing line). Thus, without further reconfiguration, the crank handle would be rotated in an opposite direction to reel in a fishing line, all other aspects considered unchanged. As an alternative, a curvature of the bail of the exemplary fishing reels discussed herein can be configured to extend in an opposite direction from the conventional direction. In other words, whereas FIG. 1 illustrates the bail curvature extending up and out from the figure, or towards the left hand side of the reel (as a user is holding the reel as if fishing), a conventional spinning reel configures the rotating bail in the opposite direction. While the conventional rotating bail can rotate such that the curvature extends in the same direction, a line roller 129 on the bail 125 (or the portion of the bail which holds the line as the line is reeled in) is on an opposite side of the spool 115, as is shown in FIG. 1. With a conventional spinning reel, a user would not position the bail with the curvature extending toward the left-hand side when casting, but this may be a preferable configuration for the current fishing reel. As another alternative, the rotor drive wheel shown in FIG. 4 could be reversed and positioned on an opposite side of the spool shaft and worm drive shaft while maintaining a same configuration of the gearing and crank handle, and configuring the curvature of the bail to extend towards the right-hand side. Also, a direction of the gearing can be reversed such that a cranking of the crank handle in the conventional reeling direction causes rotation of the spool in the proper direction for reeling in the line with the bail extending towards the right-hand side of the reel frame.

Figure 7:
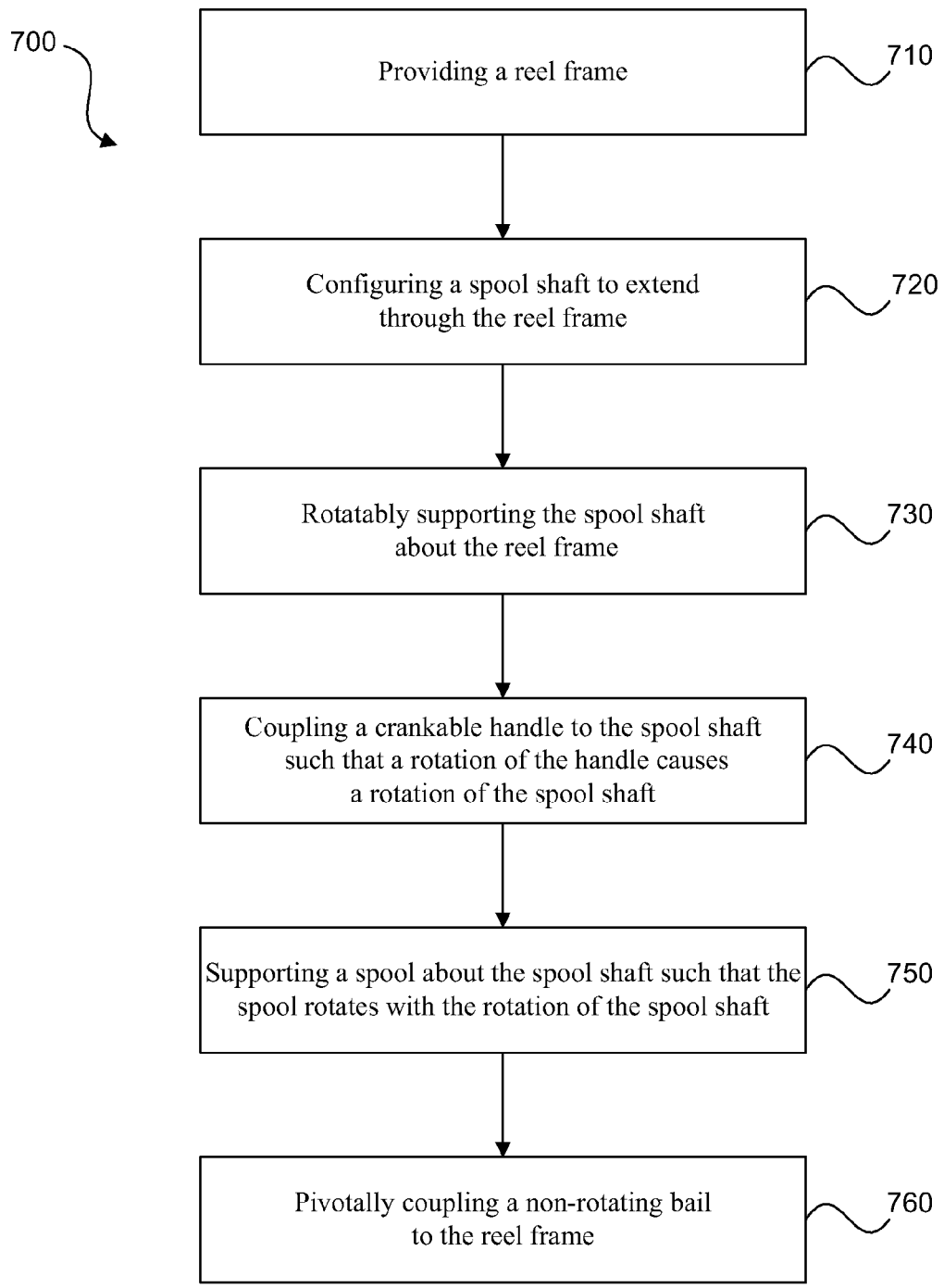
FIG. 7 illustrates a flow diagram of a method of forming a fishing reel in accordance with an embodiment of the present technology.

Referring now to FIG. 7, a flow diagram of method 700 for forming or configuring a fishing reel is illustrated in accordance with an example of the present technology. The method can include providing 710 a reel frame and configuring 720 a spool shaft to extend through the reel frame. The spool shaft can be rotatably supported 730 about the reel frame and a crankable handle can be coupled 740 to the spool shaft such that a rotation of the handle causes a rotation of the spool shaft. A spool can be supported 750 about the spool shaft such that the spool rotates with the rotation of the spool shaft and a non-rotating bail can be pivotally coupled 760 to the reel frame.

The method can further include various more detailed provisions, such as forming an oscillation shaft with a slot therein, inserting the oscillation shaft into the spool shaft, coupling an oscillating gear to the spool via the oscillation shaft to cause the spool to oscillate up and down with the rotation of the handle, and so forth, in line with the description set forth herein.

In another aspect, the method can include coupling the oscillation shaft to the bail rather than the spool, such that the bail is configured to oscillate while the rotating spool maintains a rotating but non-oscillating position relative to the frame. Thus, though the bail is a non-rotating bail, the bail may oscillate to assist in evenly distributing the fishing line on the rotating spool while winding the fishing line on the spool. This configuration can be implemented in a variety of methods. For example, the spool can be coupled to the spool shaft for rotation. The oscillation shaft may be arranged to the side of the spool shaft rather than through the middle of the spool shaft, and can be coupled to the bail or bail support, which is non-rotating and not fixed to the reel frame. As another example implementation, the spool can be coupled to the spool shaft for rotation. The worm gear can be on an end of the spool shaft, with the pinion collar and pawl causing an oscillation shaft to oscillate, which can be substantially parallel to the spool shaft, such as where the worm drive shaft is illustrated in some of the above examples. The oscillation shaft can be coupled to the bail or bail support to oscillate the bail. These examples for implementing an oscillating bail with a rotating spool are intended to be non-limiting, as various other example implementations are also possible and may be recognized by those having skill in the art.

Figure 8:
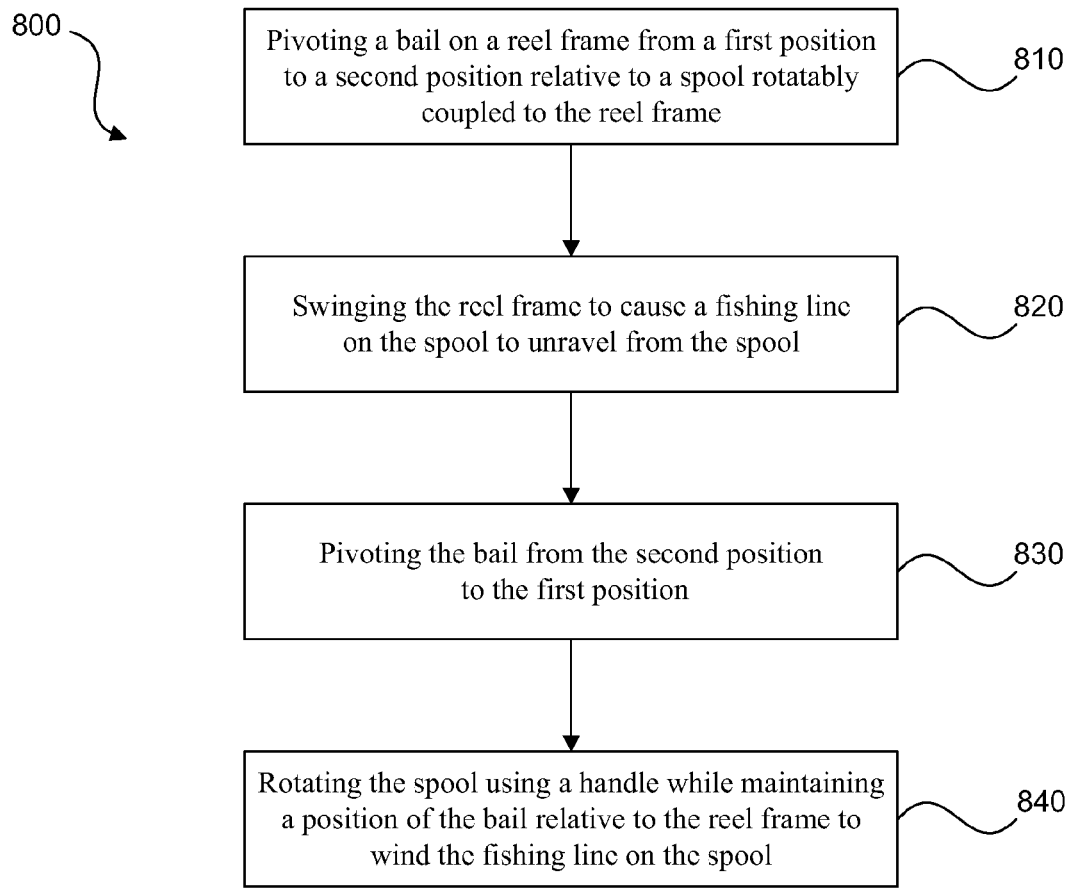
FIG. 8 illustrates a flow diagram of a method of using a fishing reel in accordance with an embodiment of the present technology.

Referring to FIG. 8, a flow diagram of a method for casting a fishing line is illustrated in accordance with an example of the present technology. The method includes pivoting 810 a bail on a reel frame from a first position to a second position relative to a spool rotatably coupled to the reel frame. The reel frame can be swung 820 through the air to cause a fishing line on the spool to unravel from the spool, such as due to the weight of a lure on an end of the fishing line. The bail can be pivoted 830 from the second position to the first position and the spool can be rotated 840 using a crank or handle to wind the fishing line on the spool while maintaining a position of the bail relative to the reel frame.

Using a fishing reel according to the present technology line twist as a result of the bail rotating around the spool of a conventional spinning reel can be significantly reduced or eliminated due to the rotation of the spool relative to a fixed, pivotable bail.

In exemplary embodiments, the fixed position of the non-rotating pivotable bail at a top of the reel and with a line roller or line feeder in proximity to a fishing reel, the fishing line can be easily accessible to the index finger. This positioning can enable easier casting, which can be of particular benefit to less-experienced fishermen learning how to operate the fishing equipment. This positioning also provides a user with the ability to pick up the fishing line with the finger tip for better control and feel of finesse lures, as well as for increased sensitivity to strikes or nibbles by a fish.

With the bail being pivotably fixed in position, there is no fumbling or turning of the fishing reel crank handle back and forth to find the line for casting or to properly position the line feeder relative to the fishing pole.

By causing the spool to rotate and pivotably fixing the bail in position relative to the spool or reel frame, the fishing reel can be constructed with fewer moving parts as compared with a conventional spinning reel. Whereas conventional spinning reels include a moving bail (moving by rotating) and a moving spool (moving by oscillation), the current fishing reel fixes the bail in position, at least in terms of rotation, and can cause the spool to perform both the rotation and the oscillation movements. With fewer moving parts, the fishing reel can have a smoother and more balanced feel.

Exemplary fishing reels of the present technology can have more power in casting (i.e., a lure can be cast further) as compared with bait casting reels because of the pivoting bail with the rotating spool.

Fishing pleasure and time can be increased for both novice and experienced fisherman by the elimination of line twist and snarls caused by traditional spinning reels. The current spinning reel can also reduce the cost of replacing large amounts of twisted and mangled fishing line twisted and mangled by traditional spinning reels.

Spooling a new line on to the current fishing reel can be easier and faster than with conventional reels and can also be tangle free. This is achieved by the rotating spool of the reel pulling in the fishing line, and can eliminate the need for flipping and/or repositioning a new spool of line.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A fishing reel, comprising:
a reel frame having a rod attachment portion for attaching the fishing reel to a fishing rod;
a spool shaft extending through the reel frame and rotatably supported about the reel frame;
a crankable handle mechanically coupled to the spool shaft such that a rotation of the handle causes a rotation of the spool shaft;
a non-rotating pivotable bail coupled to the reel frame; and
a spool mechanically coupled to the spool shaft and configured to rotate with the rotation of the spool shaft relative to the bail upon a rotational axis which is fixed relative to the rod attachment portion of the reel frame.

2. A fishing reel as in claim 1, wherein the rotational axis of the spool is coaxial with a rotational axis of the spool shaft, and substantially parallel with an axis along a length of the fishing rod to which the reel frame attaches.

3. A fishing reel as in claim 1, wherein the spool supports a fishing line and the bail is configured to pivot around the spool between a fishing line release position and a fishing line holding position.

4. A fishing reel as in claim 1, wherein the bail is fixed in position relative to the reel frame to maintain a consistent orientation of a fishing line on the spool relative to the reel frame.

5. A fishing reel as in claim 1, in combination with the fishing rod to which the reel frame is attached.

6. A fishing reel as in claim 1, further comprising an oscillation shall that is oscillatable within the spool shaft to oscillate the spool back and forth along a rotation axis of the spool shall as the spool rotates, wherein the spool simultaneously rotates and oscillates.

7. A fishing reel as in claim 1, wherein endpoints of the bail are positioned such that an extending direction of the bail from the endpoints when the bail is pivoted to an open position extends in a direction substantially parallel to a longitudinal axis of the fishing rod and an extending direction of the bail from the endpoints when the bail is pivoted to a closed position extends laterally substantially perpendicular to the longitudinal axis of the fishing rod.

8. A fishing reel as in claim 1, wherein the bail pivots independently of the spool.

9. A fishing reel as in claim 1, wherein endpoints of the bail are positioned nearer to a top of die spool than to a bottom of the spool, the bottom of the spool being in closer proximity to the reel frame than the top of the spool.

10. A fishing reel as in claim 1, wherein end points of the bail and a point on the fishing rod when attached to the fishing reel at the attachment portion form a substantially straight imaginary line extending from the point on the fishing rod through both end points.

11. A method for forming a fishing reel, comprising:
providing a reel frame having a rod attachment portion for attaching the fishing reel to a fishing rod;
configuring a spool shaft to extend through the reel frame;
rotatably supporting the spool shaft about the reel frame;
coupling a crankable handle to the spool shaft such that a rotation of the handle causes a rotation of the spool shaft;
supporting a spool about the spool shaft such that the spool rotates with the rotation of the spool shaft upon a rotational axis which is fixed relative to the rod attachment portion of the reel frame; and
pivotally coupling a non-rotating bail to the reel frame.

12. The method as in claim 11, further comprising coupling an oscillating gear to at least one of the spool and the bail to cause the at least one of the spool and the bail to oscillate up and down with the rotation of the handle.

13. A fishing reel assembly, comprising:
a reel frame;
a spool rotatably supported about the reel frame; and
a crankable handle mechanically coupled to the spool such that a rotation of the handle causes a rotation of the spool upon a rotation axis;
wherein the spool oscillates along the rotation axis of the spool simultaneously with the rotation of the spool.

14. A fishing reel assembly as in claim 13, wherein the spool rotates with the rotation of a spool shaft through indirect coupling of the spool to the spool shaft.

15. A fishing reel assembly as in claim 14, wherein the spool is coupled to an oscillation shaft within the spool shaft, the oscillation shaft being configured to oscillate the spool up and down while rotating with the rotation of the spool shaft.

* * * * *